March 11, 1952 — W. R. BECK — 2,588,341
SHUTTLE CAR
Filed April 20, 1949 — 4 Sheets-Sheet 1

INVENTOR.
William R. Beck
BY Clarence F. Poole
ATTORNEY

March 11, 1952 W. R. BECK 2,588,341
SHUTTLE CAR
Filed April 20, 1949 4 Sheets-Sheet 2
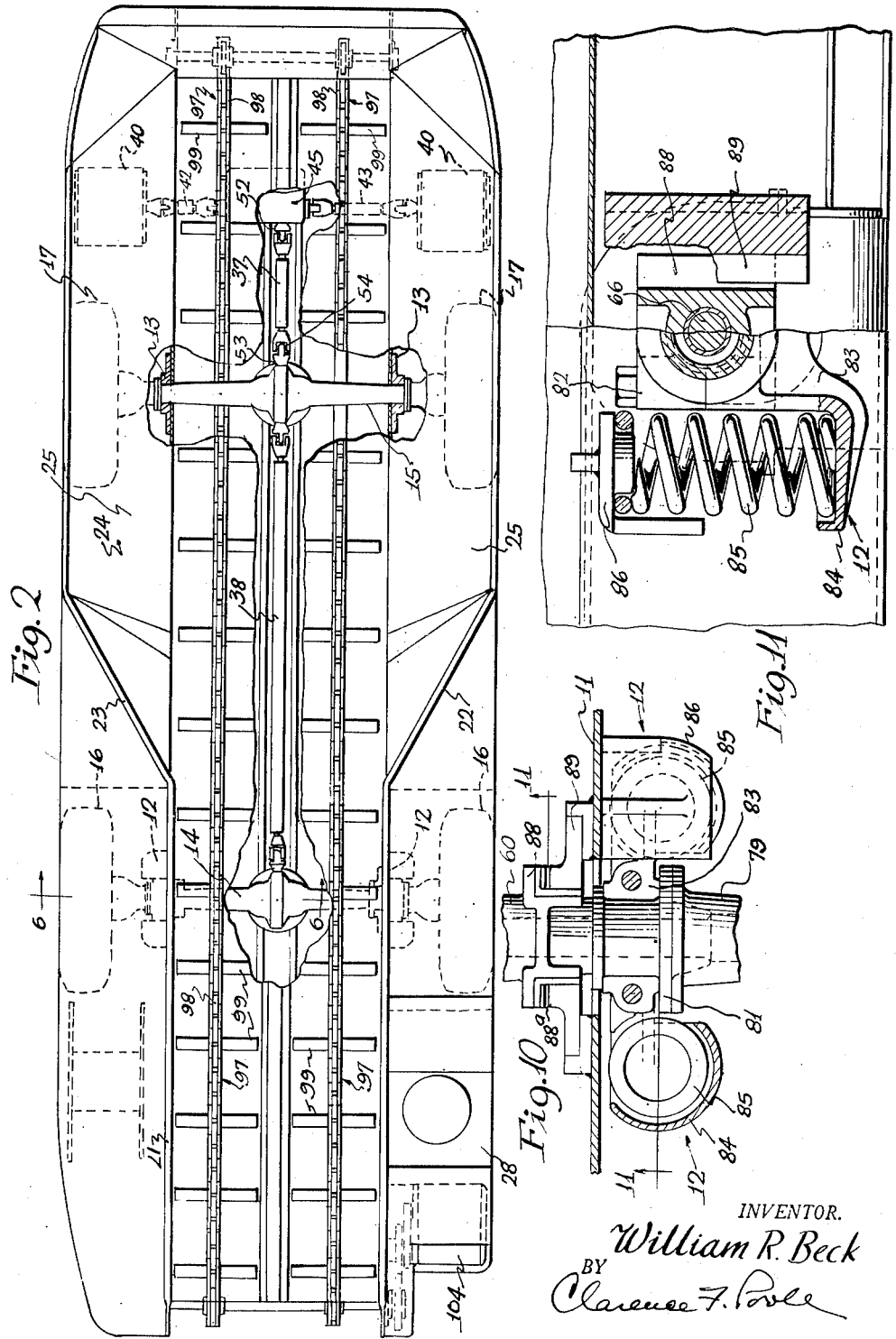
INVENTOR.
William R. Beck
BY
Clarence F. Poole
ATTORNEY

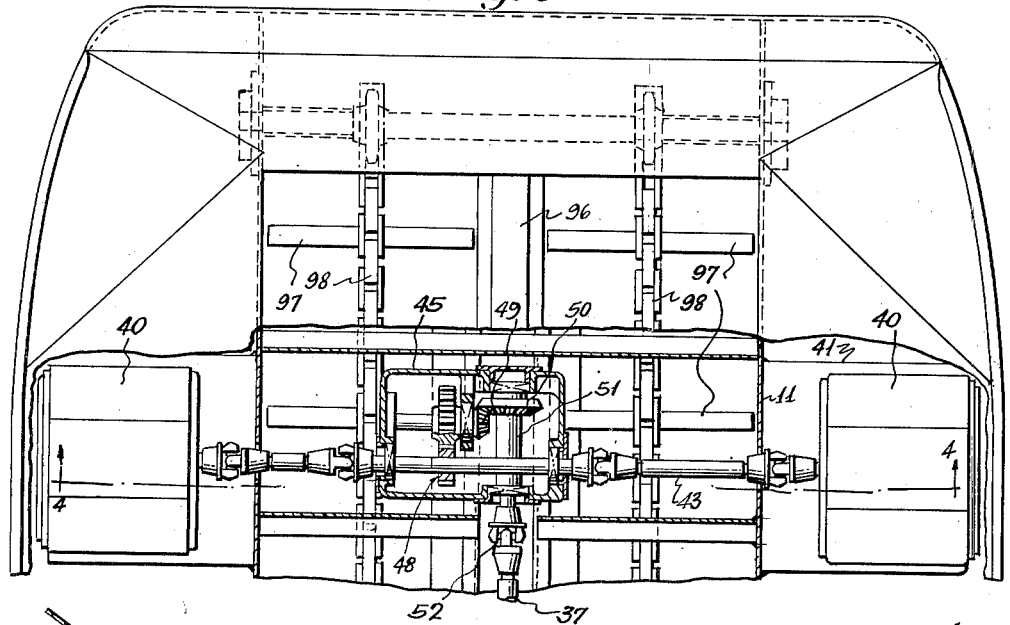
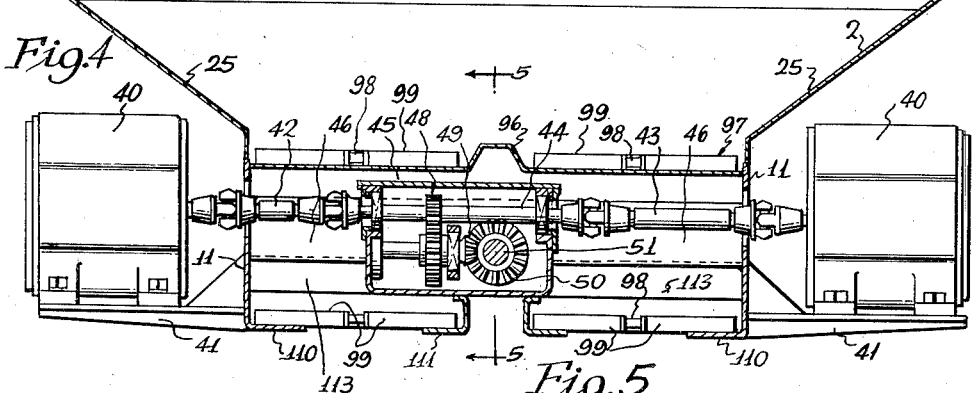
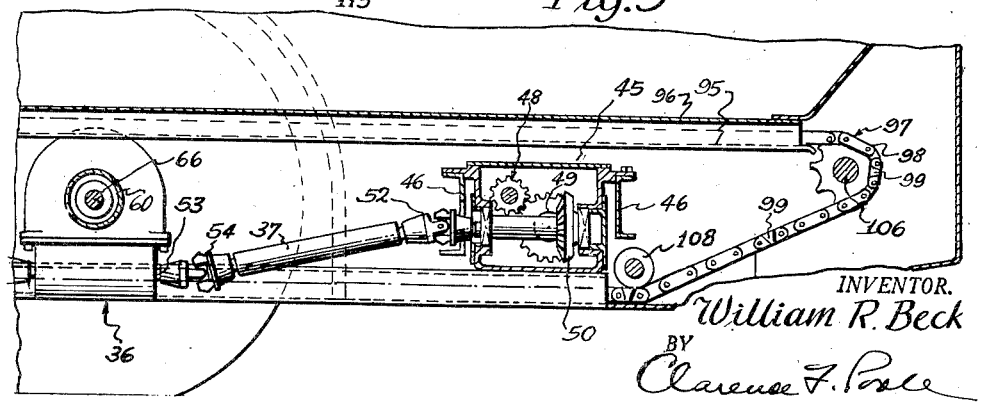

March 11, 1952 W. R. BECK 2,588,341
SHUTTLE CAR
Filed April 20, 1949 4 Sheets-Sheet 4

INVENTOR.
William R. Beck
BY
Clarence F. Poole
ATTORNEY

Patented Mar. 11, 1952

2,588,341

UNITED STATES PATENT OFFICE 2,588,341

SHUTTLE CAR

William R. Beck, Chicago, Ill., assignor to Goodman Manufacturing Company, Chicago, Ill., a corporation of Illinois Application April 20, 1949, Serial No. 88,575

3 Claims. (Cl. 214—83.36)

This invention relates to improvements in self-propelled material handling vehicles of the rubber-tired type, commonly referred to as shuttle cars, used in mines for transporting coal or other mined material from the working face of a mine to an unloading station. Such vehicles are especially adapted to receive loose material from a material gathering or loading machine at the working face of a mine, and are provided with a material carrying compartment extending substantially the full length thereof, with a conveyor along the bottom of said compartment for discharging its load from one end when the vehicle reaches the unloading station.

One of the principal requirements of vehicles of this kind is that of compactness of design and particularly a low overall height for operation within the space limitations usually imposed by operating conditions in mines.

The principal object of the present invention is to provide a vehicle of the character above described with an improved form of propelling mechanism for the driving wheels, together with an improved form and arrangement of conveyor mechanism along the bottom of the material carrying compartment so as to increase the carrying capacity of the shuttle car within the available space limitations.

Other objects and advantages of my invention will appear from time to time as the following description proceeds.

The invention may best be understood by reference to the accompanying drawings, in which:

Figure 2 is a top plan view of the shuttle car shown in Figure 1, with parts broken away to show a portion of the wheel driving mechanism;

Figure 3 is an enlarged fragmentary detailed plan view with parts broken away to show the power connections to the central worm drive mechanism;

Figure 4 is a detailed section of the motor driven gearing, taken on line 4—4 of Figure 3;

Figure 5 is a detailed section taken on line 5—5 of Figure 4, but drawn to a slightly larger scale than the latter figure;

Figure 10 is a detailed section in plan view showing the spring mounting for the driving axles, with parts shown in section; and Figure 11 is a detailed section on line 11—11 of Figure 10, drawn to a larger scale.

Figure 1:
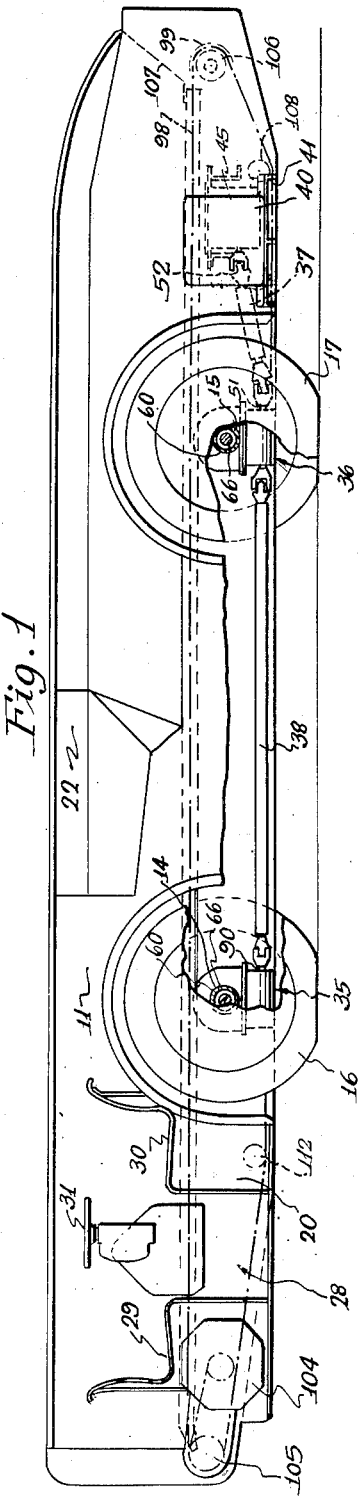
Figure 1 is a view of a shuttle car constructed in accordance with my invention, with the car shown in side elevation but with parts broken away to show a portion of the wheel driving mechanism.

Referring now to details of embodiment of my invention illustrated in the drawings, the shuttle car, as shown in Figures 1 and 2, has a main frame including a pair of laterally spaced side plates 11, 11 extending the length of the vehicle and through which front and rear axles indicated generally at 14 and 15, respectively, are supported, as will hereinafter appear. The front and rear axles have rubber-tired wheels 16, 16 and 17, 17 on their outer ends. The illustrative form of vehicle shown is of the 4-wheel drive type, and both front and rear wheels 16 and 17 are arranged for steering movement.

The material carrying compartment of the vehicle consists of upstanding laterally spaced walls 20, 21, which walls constitute an extension of the side plates 11, 11 at the front of the car, and are flared outwardly at 22, 23 to a widened hopper-like portion, indicated generally at 24 at the rear end of the vehicle, defined by a pair of outwardly inclined plates 25, 25. The latter plates extend over the rear wheels 17, so as to afford increased capacity at the rear end of the vehicle and also a wider horizontal area for receiving loose material from the overhanging boom of a loading machine. This arrangement of a material carrying compartment, with a relatively narrow front portion and a larger hopper-like rear portion 24, is commonly employed in certain types of shuttle cars. Also, as usual, a driver's station, indicated generally at 28, may be located near the forward end of the vehicle in advance of one of the front wheels 16. In the form shown herein, said operator's station consists of two oppositely facing seats 29 and 30 with a steering wheel 31 mounted on the side wall 20 between said seats so that the operator can face in either direction, as desired, for steering the vehicle.

Referring now more particularly to the propelling mechanism and the bottom conveyor, which constitute the principal features of my invention, the 4-wheel drive of the vehicle is accomplished through two worm gear drive mechanisms, indicated generally at 35 and 36, located at the center of the front and rear axles 14 and 15, respectively, and driven from a common source of power through a propeller shaft 37, herein connected at one end of the rear worm gear drive 36. A second propeller shaft 38 connects the rear worm gear drive 36 with a similar front worm gear drive 35, as shown in Figures 1 and 2.

The propeller shaft 37 is preferably driven from two electric motors 40, 40, each located to the rear of one of the rear drive wheels 17 and beneath the inclined side walls 25, 25 of the hopper portion 24. Said motors are suitably supported on outstanding brackets 41, 41 connected to the upright side frame members 11, 11 as shown in Figure 5. The drive shafts of the two motors 40, 40 are connected by universally jointed intermediate shafts 42 and 43 to opposite ends of a common traverse shaft 44, suitably journaled in a gear reduction housing 45 adjacent the center of the vehicle and suitably supported by the cross frame members 46, 46 connected between the side plates 11, 11. The two drive motors 40, 40 are preferably driven in unison and their arrangement on opposite sides of the vehicle as shown contributes to greater compactness and symmetry of design of the car.

A suitable gear reduction mechanism, indicated generally at 48, is mounted in the housing 45, including a beveled pinion 49 meshed with a beveled gear 50 on a longitudinal drive shaft 51, disposed centrally of the vehicle. The drive shaft 51 is connected to the propeller shaft 37 through a universal joint 52, and the propeller shaft 37 is connected to the worm shaft of the rear worm drive mechanism 36 through a universal joint 54. The two worm gear drives 35 and 36 are substantially similar so that a description of the front worm gear mechanism 35 will suffice for an understanding of both.

Figure 8:
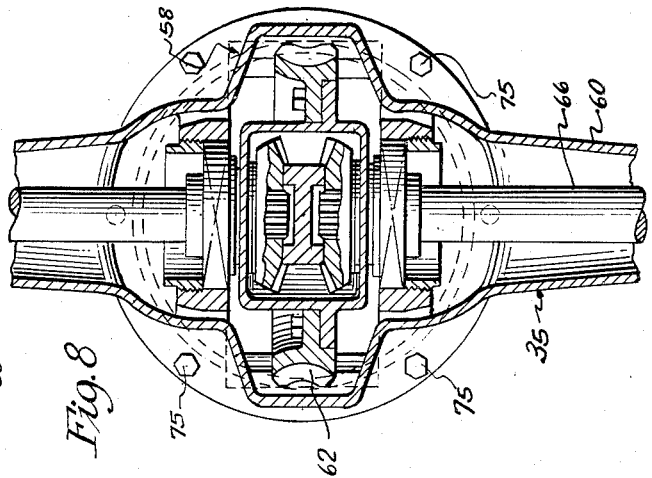
Figure 8 is a detailed view of the differential gear shown in Figure 7, with some of the parts shown in horizontal section.
Figure 9:
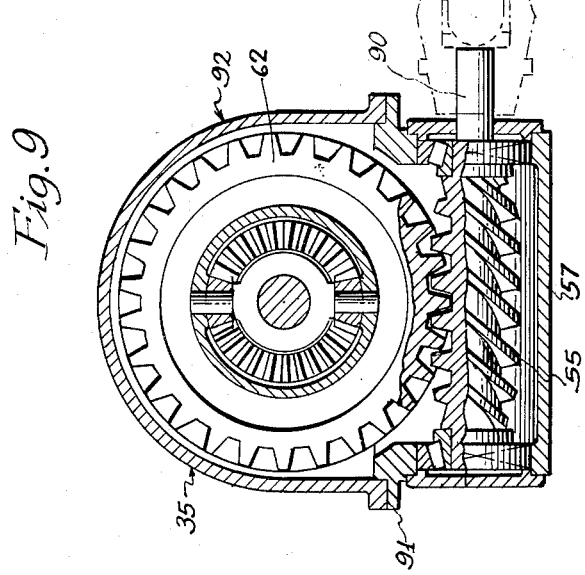
Figure 9 is a detailed vertical section of the differential gear similar to that shown in Figures 6, 7 and 8 but, in this case, the differential gearing is that employed on the front driving axle of the vehicle.
Figure 6:
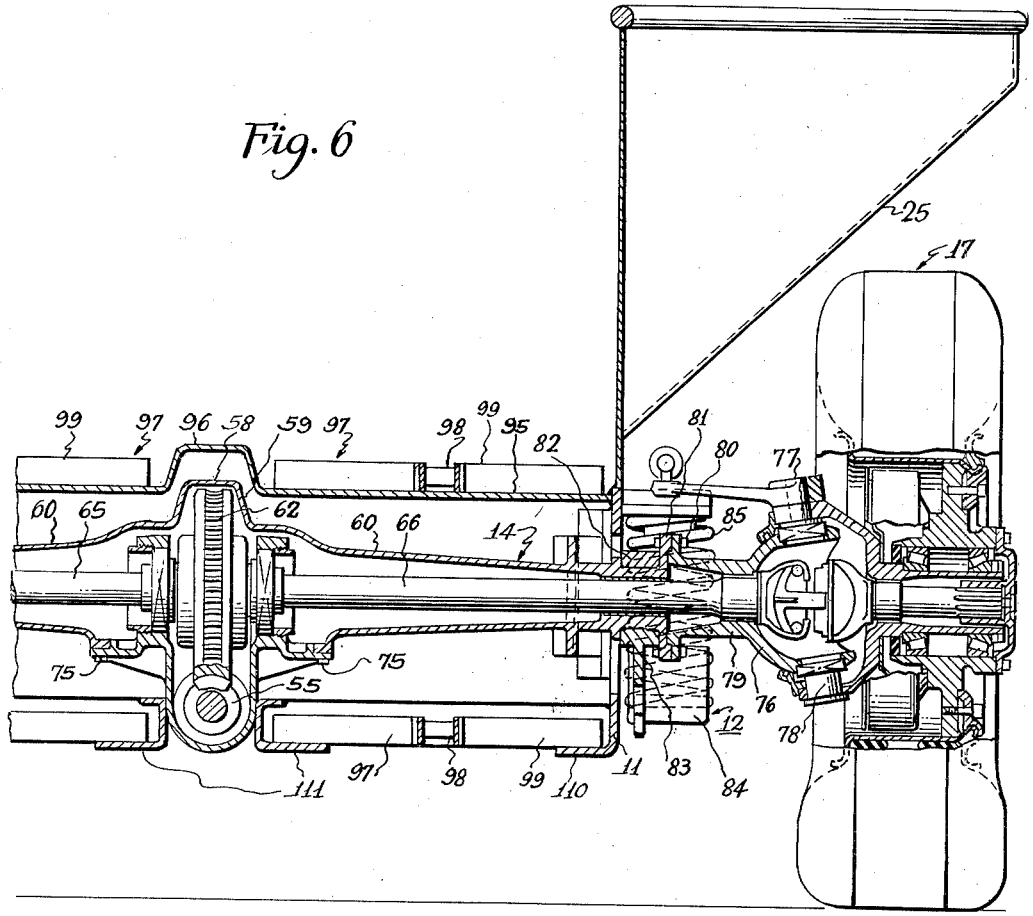
Figure 6 is an enlarged detailed section taken on line 6—6 of Figure 2.
Figure 7:
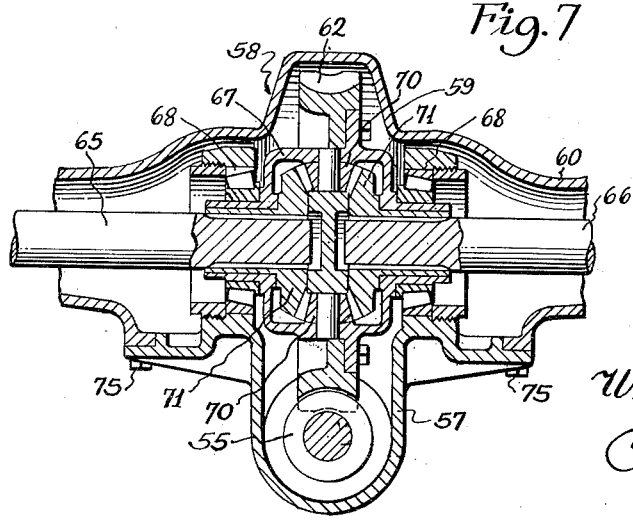
Figure 7 is an enlarged detailed view of the differential gear shown in Figure 6 with most of the gears shown in vertical section.

As shown in Figures 6, 7 and 8, the worm gear mechanism 35 on the front axle 14 includes the worm shaft 53 having a worm 55 thereon, and journaled at opposite ends in the lower part 57 of a gear housing, indicated generally at 58. The upper portion 59 of the gear housing 58 has integrally formed hollow tubular extensions 60, 60, which constitute a unitary dead axle structure extending at opposite ends through pedestals 12, 12 where they are spring supported with respect to the vehicle, as will hereinafter more fully be described.

Within the enlarged upper portion 59 of the gear housing 58 is mounted a worm gear 62 meshing with the worm 55. The worm gear 62 forms part of a differential drive gearing of conventional type enclosed in the housing 58 for driving the two live axle members 65 and 66. Details of the differential gearing need not be fully described herein, as it forms no part of the present invention, except to point out hollow support 67 rotatably mounted at opposite ends in anti-friction bearings 68, 68 and having the worm gear 62 fixed about its periphery. The hollow support 67 has a pair of inwardly extending beveled pinions 70, 70 meshing with beveled gears 71, 71 splined on the ends of the shafts 65 and 66 in the usual manner.

The lower portion 57 of the worm gear housing 58 is detachably connected to the upper portion 59 of said portion as by a plurality of bolts 75, 75.

The outer end of the live shafts 65 and 66 have driving connection with their respective wheels 16 through a conventional steering knuckle mechanism, shown in Figure 6. This steering knuckle and drive connection need not be described in detail, as it forms no part of the present invention, excepting to point out those parts associated with the spring suspension means for opposite ends of the axle shown in detail in Figures 10 and 11. A hollow semi-spherical member 76, on which the opposed pivot pins 77 and 78 of the steering knuckle are rotatably supported at their inner ends, is formed integral with an extension tube 79, which is secured as by bolts 80 to the flanged outer end 81 of the hollow axle tube 60 of the axle structure 15. Immediately within the flanged outer end 81 of the axle tube 60 is a split bearing support 82 surrounding said tube. The lower portion 83 of said split bearing support has a pair of outwardly extending ledges 84, 84 which form abutments for the lower ends of coil springs 85. The upper end of these springs engage brackets 86, 86 secured to and projected outwardly from the adjacent side plate 11 of the vehicle.

Each end of the axle tube 60 is guided for vertical movement in the pedestal structure 12 herein consisting of vertically extending guide plates 88 formed integrally with the tube and adapted for vertical movement between upright guide plates 89 fixed to the inner face of the side plate 11. The guide plates 88 include outwardly flanged thrust plates 88a which hold the axle structure in centered relation relative to the vehicle. As shown in Figure 10, a slight clearance is normally provided between the thrust plates 88a and the opposed inwardly facing surfaces of the fixed guide plate 89, so as to permit limited vertical tilting movement of the axle structure relative to the main frame of the car.

In the illustrative form shown herein, the rear axle 15 instead of being spring mounted with respect to the car, has the opposite ends of its axle tube 60 fixed in brackets 13, 13 attached to side plates 11, 11.

Details of the worm gear mechanism 36 on the rear axle 15 are the same as already described in connection with the rear axle construction shown in Figures 6 to 9, inclusive, excepting that its worm shaft 90 extends through the front end of the lower portion 91 of the gear housing 92, for connection with the propeller shaft 38 leading to the front axle.

As will be seen from Figures 2, 4 and 6, the two worm gear structures 35 and 36 each include relatively large worm gears 62 disposed along the center of the vehicle. In order to accommodate these worm gears without materially reducing the capacity of the vehicle, the bottom of the elongated material carrying compartment is formed of a generally horizontal plate 95, fixed along its outer edges to the upright side plates 11, 11 of the vehicle, but provided along its center with a continuous arched or ridge-like formation 96 of sufficient height to clear the enlarged top portions 59 of the two gear housings 58 of the front and rear axles, as shown in Figure 6.

Along opposite sides of this central ridge 96 of the bottom plate is trained a pair of flight conveyors 97, 97 which may be of conventional type, each consisting of a central chain 98 having flights 99 in spaced relation therealong. Each of the chains are trained over drive sprockets 100 fixed on a transverse shaft 101 at the discharge end of the bottom plate 95 adjacent the front end of the vehicle. The drive shaft 101 may be driven in any suitable manner, as for instance, through a gear reduction drive 103 connected to a driving motor 104 disposed under the front seat 29 of the operator outside the upright side plate 20.

The rear ends of the conveyor chains 98 are trained over sprockets 105 on an idler shaft 106 shrouded under an end plate 107 at the rear end of the car. From the idler shaft 106, the two chains extend forwardly and downwardly over idlers 108 so as to pass beneath the gear reduction housing 45, as shown in Figure 5. From thence, the lower return reaches of the conveyors 97 are carried along inwardly projecting ledges 110, 111 to idlers 112 near the front of the machine and thence in an upwardly inclined direction to the drive sprockets 105 at the front end of the machine. In the form shown herein, the outermost ledges 110 for supporting the lower reaches of the conveyors 97, 97 are connected to the side plates 11, while the innermost pair of ledges 111 are suitably fastened to cross members 113 extending between said plates, as shown in Figures 4 and 6.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a vehicle of the class described, a main frame having upright walls and a bottom plate defining an open-ended material carrying compartment extending longitudinally thereof, axle structures having wheels thereon, for supporting said vehicle, means for propelling said vehicle including a worm gear mechanism on at least one of said axles disposed centrally thereof, said bottom plate having a centrally disposed, open-bottomed, longitudinally extending arched portion registering with and disposed above said worm gear mechanism to accommodate the upper portion of the same, and a pair of endless conveyors mounted for movement along said bottom plate at opposite sides of said arched portion for discharging material from the open end of said compartment, and means for driving said conveyors.

2. A vehicle structure in accordance with claim 1, wherein each of the axle structures have worm gear mechanisms connected for simultaneous propulsion by propeller shaft means extending longitudinally of the vehicle beneath said bottom plate, and the centrally disposed, open-bottomed, longitudinally extending arched portion of said bottom plate extends substantially the full length of the latter and is disposed above said gear mechanisms to form a receptacle for the upper portions of same.

3. A vehicle structure in accordance with claim 1, wherein the worm gear mechanism has drive means including a pair of motors mounted on opposite sides of the vehicle outside the material carrying compartment and operatively connected to said worm gear mechanism through a single drive member.

WILLIAM R. BECK.

REFERENCES CITED

The following references are of record in the file of this patent:

UNITED STATES PATENTS

| Number | Name | Date |
| --- | --- | --- |
| 1,381,869 | Graham | June 14, 1921 |
| 1,661,780 | Warhus | Mar. 6, 1928 |
| 2,079,814 | Renault | May 11, 1937 |
| 2,143,522 | McCarthy | Jan. 10, 1939 |
| 2,195,572 | Konicek | Apr. 2, 1940 |
| 2,209,177 | Stoltz | July 23, 1940 |
| 2,395,333 | Lee | Feb. 19, 1946 |
| 2,399,619 | Beck | May 7, 1946 |